(12) United States Patent
Iskander et al.

(10) Patent No.: US 9,940,513 B2
(45) Date of Patent: Apr. 10, 2018

(54) INTUITIVE SELECTION OF A DIGITAL STROKE GROUPING

(71) Applicant: Microsoft Technology Licensing, LLC., Redmond, WA (US)

(72) Inventors: Carine Ramses Iskander, Redmond, WA (US); Jie Wu, Bellevue, WA (US); Ian William Mikutel, Redmond, WA (US); Sarah Elizabeth Sykes, Redmond, WA (US); David Glen Garber, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 65 days.

(21) Appl. No.: 15/219,118

(22) Filed: Jul. 25, 2016

(65) Prior Publication Data
US 2017/0262700 A1    Sep. 14, 2017

Related U.S. Application Data

(60) Provisional application No. 62/307,138, filed on Mar. 11, 2016.

(51) Int. Cl.
*G06K 9/00*     (2006.01)
*G06F 3/0484*   (2013.01)
*G06K 9/46*     (2006.01)
*G06F 17/24*    (2006.01)

(52) U.S. Cl.
CPC ..... *G06K 9/00436* (2013.01); *G06F 3/04842* (2013.01); *G06F 17/242* (2013.01); *G06K 9/00416* (2013.01); *G06K 9/4642* (2013.01)

(58) Field of Classification Search
None
See application file for complete search history.

(56) References Cited

U.S. PATENT DOCUMENTS

| | | |
|---|---|---|
| 8,037,417 B2 | 10/2011 | Jarrett et al. |
| 8,181,103 B2 | 5/2012 | Lin et al. |
| 8,566,752 B2 | 10/2013 | Piersol et al. |

(Continued)

OTHER PUBLICATIONS

Hinckley, et al., "Phrasing Techniques for Multi-Stroke Selection Gestures", In Proceedings of the Graphics Interface, Jun. 7, 2006, 8 pages.
"Ink Analysis Overview", Published on: Sep. 18, 2012 Available at: https://msdn.microsoft.com/en-us/library/windows/desktop/ms704040(v=vs.85).aspx.
"Microsoft OneNote 2010 : Taking Notes in Your Own Handwriting (part 2)", Published on: Apr. 11, 2013 Available at: http://guides.wmlcloud.com/Office/microsoft-onenote-2010---taking-notes-in-your-own-handwriting-(part-2).aspx.

(Continued)

*Primary Examiner* — Bernard Krasnic
(74) *Attorney, Agent, or Firm* — Merchant & Gould

(57) ABSTRACT

Improved accuracy and user interaction efficiency for selecting a grouping of digital strokes is provided. In response to receiving an indication of a selection input on or in proximity to a digital stroke, a determination is made as to whether the digital stroke is part of an existing group of digital strokes. When the digital stroke is not part of an existing group, an analysis of the digital stroke and other digital strokes within a calculated boundary is performed for determining which strokes should be included in a stroke grouping. A stroke grouping is generated based on the determination. Accordingly, in response to the selection input on or in proximity to the digital stroke, the selection is expanded to the stroke grouping, thus improving the accuracy of the selection gesture and improving computer efficiency.

20 Claims, 12 Drawing Sheets

(56) References Cited

U.S. PATENT DOCUMENTS

| | | | |
|---|---|---|---|
| 2003/0007683 A1 | 1/2003 | Wang et al. | |
| 2003/0086611 A1* | 5/2003 | Loudon | G06K 9/342 |
| | | | 382/186 |
| 2007/0234878 A1* | 10/2007 | Worrall | G10H 1/0016 |
| | | | 84/485 R |
| 2008/0231635 A1 | 9/2008 | Saund | |
| 2008/0232690 A1* | 9/2008 | Saund | G06F 3/04883 |
| | | | 382/187 |
| 2008/0260241 A1 | 10/2008 | Ye et al. | |
| 2008/0292190 A1 | 11/2008 | Biswas et al. | |
| 2009/0094560 A1 | 4/2009 | Grossman et al. | |
| 2011/0307535 A1 | 12/2011 | Vukosavljevic et al. | |
| 2013/0307861 A1 | 11/2013 | Lang et al. | |
| 2015/0121305 A1 | 4/2015 | Saund et al. | |
| 2016/0048318 A1 | 2/2016 | Markiewicz | |

OTHER PUBLICATIONS

"Selecting and Editing Ink", Retrieved on: Mar. 11, 2016 Available at: https://msdn.microsoft.com/en-us/library/ms698559(v=vs.85).aspx.

Chiu, et al., "A Dynamic Grouping Technique for Ink and Audio Notes", In Proceedings of the 11th annual symposium on user interface software and technology, Nov. 1, 1998, pp. 195-202.

"International Search Report and Written Opinion Issued in PCT Application No. PCT/IB2017/000257", dated Sep. 4, 2017, 11 Pages.

* cited by examiner

INTUITIVE SELECTION OF A DIGITAL STROKE GROUPING

CROSS-REFERENCE TO RELATED APPLICATIONS

The application claims priority to U.S. Provisional Patent Application No. 62/307,138 titled "Intuitive Selection of a Digital Stroke Grouping" filed Mar. 11, 2016, the disclosure of which is hereby incorporated by reference in its entirety.

BACKGROUND

Various types of computing devices and a variety of software applications enable "inking" input, wherein a user composes text or drawings from a plurality of stroke inputs, sometimes referred to as digital ink. For example, some computing devices accept stroke input via natural user interface input methods (e.g., touch, gesture), via a handwriting input device (e.g., a digital pen or stylus), or by movement of a mouse pointer, touchpad pointer, etc.

Computer and software users have grown accustomed to user-friendly software applications that provide intuitive graphical user interfaces and accurate and efficient user experiences. For example, most users of software applications who are familiar with pointer interaction have come to expect that a selection input, such as double-clicking, double-tapping, etc., will select an object displayed under a pointer displayed on a screen or under a touchpoint on a touch screen. Accordingly, when interacting with digital strokes, a user may desire that double-clicking or double-tapping on or in proximity to text or a drawing object formed of multiple digital strokes will cause a selection of the text or drawing object rather than a selection of an individual stroke within the text or drawing object.

SUMMARY

This summary is provided to introduce a selection of concepts in a simplified form that are further described below in the Detailed Description section. This summary is not intended to identify key features or essential features of the claimed subject matter, nor is it intended as an aid in determining the scope of the claimed subject matter. Aspects are directed to a device, method, and computer-readable medium to improve accuracy and computer efficiency for selecting a grouping of digital strokes. A user draws text or drawings via "inking" or digital stroke input, and makes a selection gesture on or in proximity to a digital stroke displayed on a screen of a computing device. In response, a determination is made as to whether the digital stroke is part of an existing or pre-defined group of digital strokes, for example, grouped via ink analysis or by manual grouping by the user. When the digital stroke is not part of an existing or pre-defined group, an analysis of the digital stroke and other strokes within a calculated boundary is performed for determining which strokes are related and should be included in a stroke grouping. A stroke grouping including the digital stroke is generated based on the determination. Accordingly, in response to the selection gesture on or in proximity to the digital stroke, the selection is expanded to include the stroke grouping, thus improving the accuracy of the selection gesture and improving computer efficiency.

Examples are implemented as a computer process, a computing system, or as an article of manufacture such as a device, computer program product, or computer readable medium. According to an aspect, the computer program product is a computer storage medium readable by a computer system and encoding a computer program of instructions for executing a computer process.

The details of one or more aspects are set forth in the accompanying drawings and description below. Other features and advantages will be apparent from a reading of the following detailed description and a review of the associated drawings. It is to be understood that the following detailed description is explanatory only and is not restrictive of the claims.

BRIEF DESCRIPTION OF THE DRAWINGS

The accompanying drawings, which are incorporated in and constitute a part of this disclosure, illustrate various aspects. In the drawings.

DETAILED DESCRIPTION

Figure 1:
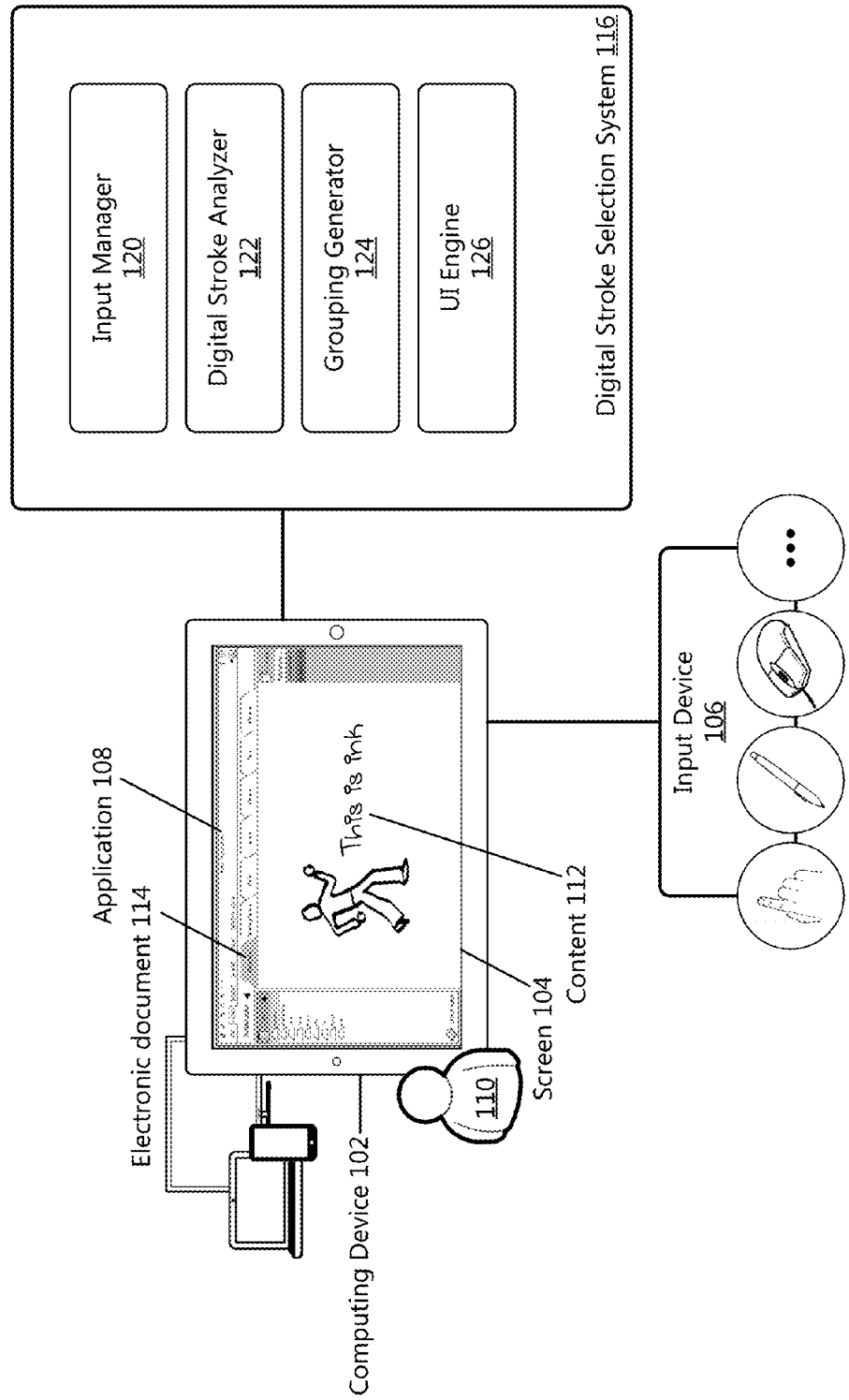
FIG. 1 is a block diagram of a representation of an example operating environment including a stroke grouping selection system for providing automated digital stroke grouping for improved selection accuracy and improved computer efficiency.

The following detailed description refers to the accompanying drawings. Wherever possible, the same reference numbers are used in the drawings and the following description refers to the same or similar elements. While examples may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description is not limiting, but instead, the proper scope is defined by the appended claims. Examples may take the form of a hardware implementation, or an entirely software implementation, or an implementation combining software and hardware aspects. The following detailed description is, therefore, not to be taken in a limiting sense.

Aspects of the present disclosure are directed to a method, system, and computer storage medium for automated digital stroke grouping for improved selection accuracy and improved computer efficiency. When a user inputs a drawing or text via a touchscreen or pen tool (i.e., "inking" input), and a stroke of a character or drawing has been selected, a digital stroke selection system computationally examines the "inking input" to determine how other strokes proximate to the selected stroke relate to the selected stroke and to each other. The digital stroke selection system is operative to generate a stroke grouping based on a determined relation. Accordingly, upon selection of a stroke that is programmatically or manually grouped with one or more other strokes, the selection is expanded to include the one or more grouped strokes.

With reference now to FIG. 1, a block diagram of one example environment 100 in communication with a digital stroke selection system 116 is shown. As illustrated, the example environment includes a computing device 102. The computing device 102 illustrated in FIG. 1 is illustrated as a mobile computing device (e.g., a tablet computer or a mobile communication device); however, as should be appreciated, the computing device 102 may be one of various types of computing devices (e.g., a tablet computing device, a desktop computer, a mobile communication device, a laptop computer, a laptop/tablet hybrid computing device, a large screen multi-touch display, a gaming device, a smart television, a wearable device, or other type of computing device) for executing applications 108 for performing a variety of tasks. The hardware of these computing devices is discussed in greater detail in regard to FIGS. 8, 9A, and 9B.

A user 110 may use an application 108 on the computing device 102 for a variety of tasks, which may include, for example, to write, calculate, draw, take and organize notes, prepare and organize presentations, send and receive electronic mail, make music, and the like. Applications 108 may include thick client applications 108, which may be stored locally on the computing device 102, or may include thin client applications 108 (i.e., web applications) that reside on a remote server and are accessible over a network, such as the Internet or an intranet. A thin client application 108 may be hosted in a browser-controlled environment or coded in a browser-supported language and reliant on a common web browser to render the application 108 executable on the computing device 102. According to an aspect, the application 108 is a program that is launched and manipulated by an operating system, and manages content 112 within an electronic document 114 and published on a display screen 104.

The content 112 in an electronic document 114 may vary according to the program used to provide the electronic document 114. The content 112 may comprise one or more objects present or imbedded in the electronic document 114 including, but not limited to: text (including text containers), numeric data, macros, images, movies, sound files, and metadata. According to one example, the content 112 includes a plurality of digital strokes, sometimes referred to herein as "inking" input, wherein a stroke is a data object that is collected from a pointing device, such as a tablet pen, a finger, or a mouse. The stroke can be created and manipulated programmatically, and can be represented visually on an ink-enabled element, such as the ink canvas. In some examples, a stroke contains information about both its position and appearance.

In various aspects, the data comprising the content 112 are stored in an elemental form by the electronic document 114, such as in eXtensible Markup Language (XML) or Java Script Object Notation (JSON) elements or another declaratory language interpretable by a schema. The schema may define sections or content items via tags and may apply various properties to content items via direct assignment or hierarchical inheritance. For example, an object comprising text may have its typeface defined in its element definition (e.g., "<text typeface=garamond>example text</text>") or defined by a stylesheet or an element above the object in the document's hierarchy from which the element depends.

With reference still to FIG. 1, an application 108 includes or is in communication with a digital stroke selection system 116, operative to provide automated digital stroke grouping and digital stroke grouping selection. In one example, the computing device 102 includes a stroke grouping application programming interface (API), operative to enable the application 108 to employ automated digital stroke grouping and selection of a digital stroke grouping via stored instructions.

According to aspects, the digital stroke selection system 116 includes: an input manager 120, operative to receive a selection input at a location on a graphical user interface, and find a nearest digital stroke to the location; a digital stroke analyzer 122 operative to determine whether the digital stroke is included in a stroke grouping; a grouping generator 124 operative to analyze strokes in a calculated area around the digital stroke for identifying strokes that should be grouped with the digital stroke, and to generate a stroke grouping including the digital stroke and the identified strokes; and a UI engine 126 operative to update the user interface to display the stroke grouping in a selected state.

The input manager 120 is illustrative of a software module, system, or device operative to receive a selection input. According to aspects, the selection input includes a physical act or motion performed on or by an input device 106 (e.g., finger, pen/stylus, mouse) at a position of a user-controlled cursor (such as a mouse cursor or touch-point on a touch-screen interface) that is interpreted as a selection interaction. According to an example, the input device 106 is a pointing device used to specify a position (e.g., x, y coordinates) on a graphical user interface (GUI), and manipulate on-screen objects. Non-limiting examples of a selection input include a tap or a double-tap of a finger for a touch or touchpad device, a left-click or a left-double-click with a mouse, a tap or a double tap with a pen/stylus, etc.

According to aspects, the input manager 120 is operative to receive the selection input, identify the position of the user-controlled cursor (e.g., mouse cursor or touch-point), and determine a nearest digital stroke. In one example, the input manager 120 uses a hit test method to determine if any stroke objects are within a predetermined radius of the cursor position. In another example, the input manager 120 uses a nearest point method to determine a nearest point of a stroke object to the cursor position. When a nearest digital stroke is determined, the input manager 120 is further operative to communicate the nearest digital stroke with the digital stroke analyzer 122. The nearest digital ink stroke is herein referred to as the first stroke.

According to an aspect, the digital stroke analyzer 122 is illustrative of a software module, system, or device operative to determine whether the first stroke identified by the input manager 120 is part of a stroke grouping. For example, a stroke object can be part of a stroke grouping as a result of ink analysis, where "inking" input is computationally divided into semantically meaningful units, such as paragraphs, lines, words, and drawing objects. As another example, a stroke object can be part of a stroke grouping as a result of a manual grouping of stroke objects by the user 110. When the first stroke is determined to be part of an existing stroke grouping, the digital stroke analyzer 122 is operative to communicate the stroke grouping with the UI engine 126.

When the first stroke is not determined to be part of an existing stroke grouping, the grouping generator 124, illustrative of a software module, system, or device, is operative to identify stroke objects that should be grouped with the first stroke, and to generate a stroke grouping including the first stroke and the identified stroke objects. According to aspects, the grouping generator 124 is operative to calculate boundaries for determining whether a stroke object should be grouped within another stroke object.

In one example, to calculate the boundaries, the grouping generator 124 determines an average stroke scale (i.e., the width and height of a typical stroke) by defining a scale testing region around the first stroke, and computing the average bounding box width and height of the stroke objects within the scale testing region. The scale testing region may be defined to be of a sufficient size to include enough stroke objects such that when taking the average stroke scale within the scale testing region, outliers, such a dots over i's and j's, cross bars of t's, and diacritic marks above or below letters, underlines, etc., will be averaged out. In one example, the scale testing region is a four-by-four inch square. As can be appreciated, the scale testing region can be various sizes, and may depend on the size of a screen 104 on which the GUI is displayed.

The grouping generator 124 is further operative to calculate boundaries of a sampling region based on the computed average stroke width and height. For example, the grouping generator 124 may establish that a word or drawing object will be separated from its horizontal neighbors by a space greater than or equal to one-half of an average stroke width, and from its vertical neighbors by a space equal to one-fourth of an average stroke height. Accordingly, a sampling region is defined for collecting stroke objects within the sampling region to add to a stroke grouping.

In one example, the grouping generator 124 defines a rectangular sampling region, the vertical boundaries of which are one-fourth of the calculated average stroke height above and below the first stroke and the horizontal boundaries of which start at one-half of the calculated average stroke width from the first stroke.

Within the defined sampling region, the grouping generator 124 is operative to analyze the sampling region for determining whether any stroke objects are located in the sampling region. In one example, a stroke object is determined to be located in the sampling region when any portion of the stroke object intersects the sampling region. In another example, a stroke object is determined to be located in the sampling region when a defined percentage of the stroke object intersects the sampling region, wherein the defined percentage is based on the computed average stroke scale.

When a stroke object is determined to be located in the sampling region, the stroke object is added to a stroke grouping that includes the first stroke. Each time a positive determination of finding stroke objects within the sampling region is made, the grouping generator 124 expands the sampling region for determining whether additional stroke objects should be included in the stroke grouping. In one example, the grouping generator 124 expands the sampling region horizontally for determining whether additional stroke objects should be included in the stroke grouping until the sampling region is expanded to the edge of the canvas. For example, the width of the sampling region is horizontally expanded by one-half of the calculated average stroke width, and the expanded sampling region is analyzed for determining whether additional stroke objects are located in the expanded sampling region.

When a negative determination is made (i.e., an additional stroke object is not included in the sampling region) or when the sampling region has been expanded to the edge of the canvas, the grouping generator 124 is operative to vertically expand the sampling region for another analysis of the sampling region. In one example, the height of the sampling region is vertically expanded by one-fourth of the calculated average stroke height. The grouping generator 124 is operative to repeat the sampling region expansion and analysis until no additional stroke objects are identified and added to the stroke grouping. When no additional strokes objects are identified, the stroke grouping is defined and includes the first stroke and the stroke objects collected by the grouping generator 124. According to an example, the stroke grouping is a collection of stroke objects that are determined to be interrelated, for example, part of a character, word, or a drawing object. The grouping generator 124 is further operative to communicate the stroke grouping with the UI engine 126.

The UI engine 126 is illustrative of a software module, system, or device operative to receive a stroke grouping either from the grouping generator 124 or from the digital stroke analyzer 122, in the case of a predefined stroke grouping by ink analysis or manual grouping, and update the GUI to display the stroke grouping in a selected state. For example, displaying the stroke grouping in a selected state may include displaying a selection outline around the stroke grouping, highlighting the stroke grouping, or providing another visual indication of the selected state of the stroke grouping.

FIGS. 2A, 3A, 4A, 5A, and 6A illustrate example graphical user GUIs from a user's perspective while selecting a digital stroke, and FIGS. 2B, 3B, 4B, 5B, and 6B illustrate example GUIs from the user's perspective after the digital stroke is automatically grouped with a plurality of other strokes into a stroke grouping and the GUI is updated to display the stroke grouping in a selected state. The illustrated GUIs 200, 300, 400, 500, 600 correspond to a note taking application 108, where a user 110 interacts with a canvas 202 for providing "inking" input and for providing a selection input for selection of an automatically grouped collection of digital strokes. As will be appreciated, other GUIs with different elements and arrangements thereof may be used in conjunction with the present disclosure; the examples given herein are non-limiting illustrations.

Figure 2A:
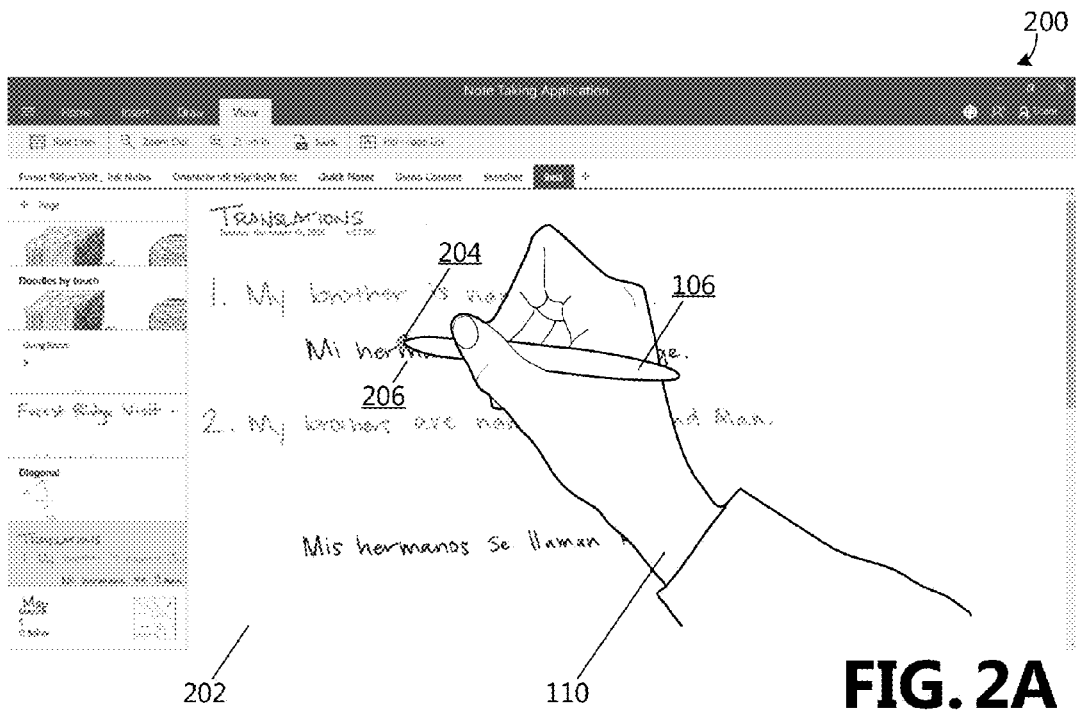
FIG. 2A is an illustration of an example graphical user interface displaying words comprised of a plurality of digital strokes.

With reference now to FIG. 2A, an example GUI 200 including a canvas 202 on which the user 110 has provided "inking" input and on which the user 110 is shown providing a selection input 204 via an input device 106 is illustrated. As illustrated, the selection input 204 is made via a digital pen/stylus proximate to a stroke object 206 that resembles the letter "m." As described above, in response to receiving the selection input 204, the digital stroke selection system 116 performs an analysis for determining the nearest digital stroke, which in the example illustrated in FIG. 2A, is the stroke object 206 resembling the letter "m." Additionally, the digital stroke selection system 116 performs an analysis for determining and selecting a collection of nearby strokes that are considered to be part of a grouping, such as a word.

Figure 2B:
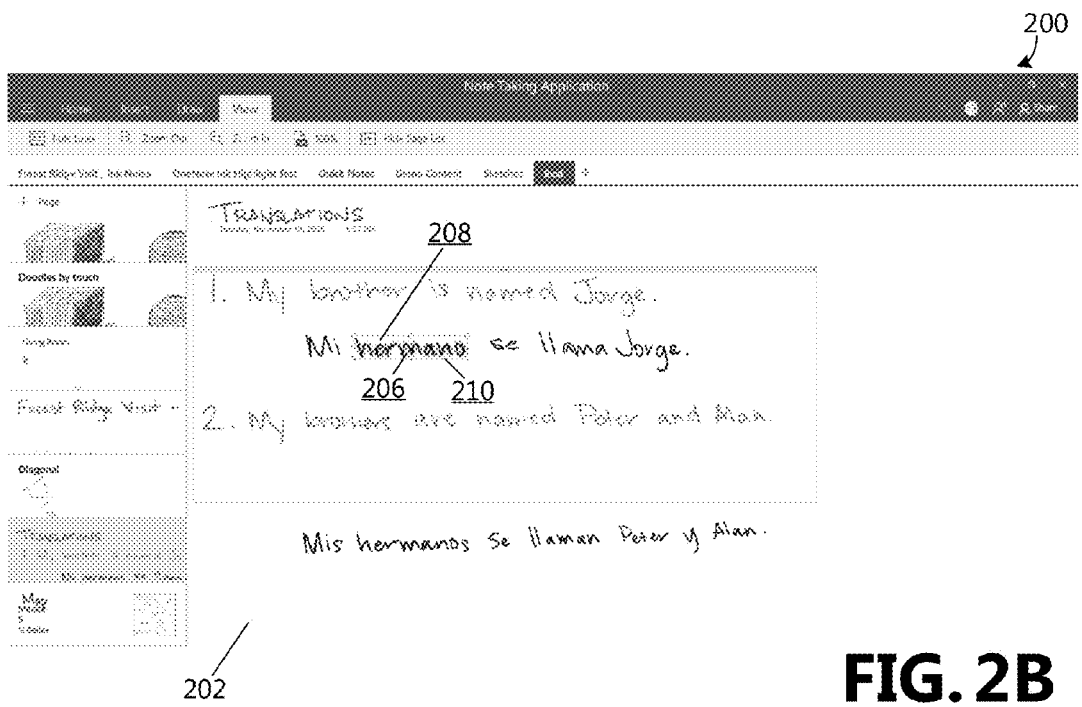
FIG. 2B is an illustration of the example graphical user interface of FIG. 2A displaying a selection of a stroke grouping embodied as a word.

With reference now to FIG. 2B, after the analysis and grouping is performed, the digital stroke selection system 116 updates the GUI 200 to display a determined stroke grouping 208 including the first stroke (i.e., stroke object 206) in a selected state. For example, in the illustrated example, the determined stroke grouping 208 includes a plurality of strokes forming characters in the word "hermano." As illustrated, a selection outline 210 is shown displayed around the stroke grouping 208, wherein the user 110 is enabled to interact with the selection outline 210 for manipulating the stroke grouping 208.

Figure 3A:
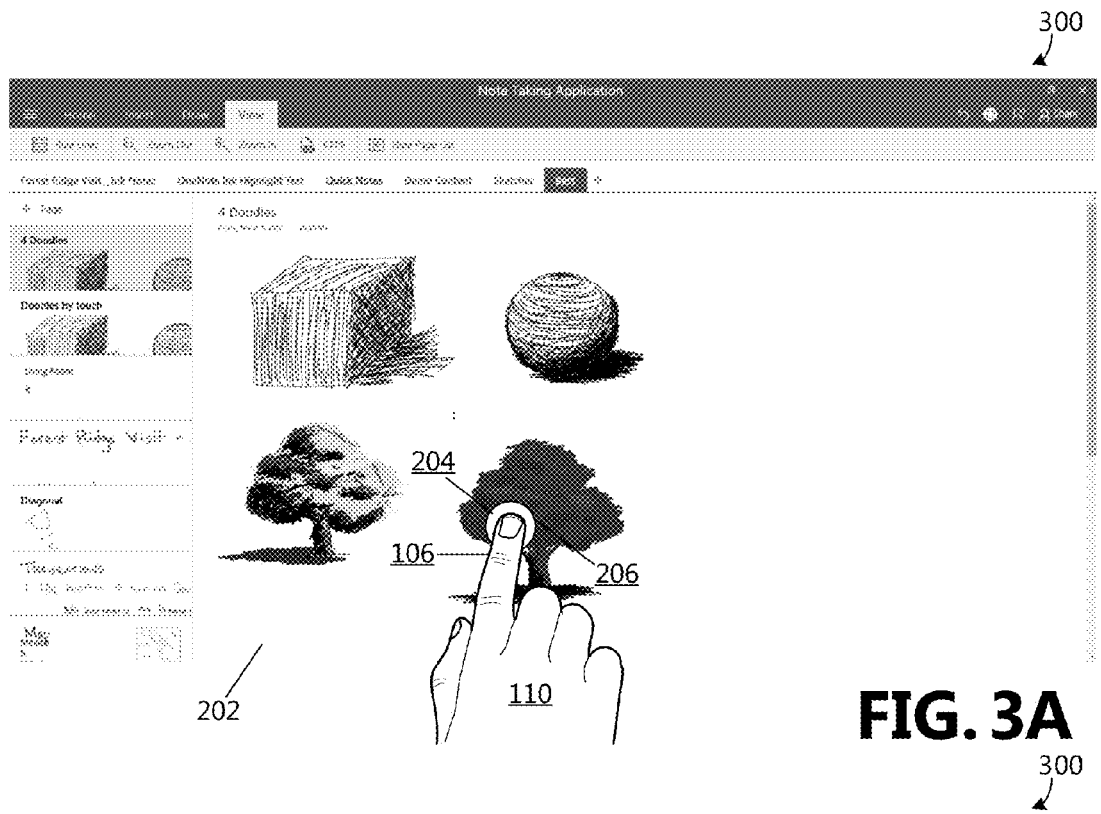
FIG. 3A is an illustration of an example user interface displaying drawing objects comprised of a plurality of digital strokes.

With reference now to FIG. 3A, an example GUI 300 including a canvas 202 on which the user 110 has provided "inking" input and on which the user 110 is shown providing a selection input 204 via an input device 106 is illustrated. As illustrated, the selection input 204 is made via a touch input on a touchscreen by the user's finger proximate to a stroke object 206 embodied as a line of a doodle (drawing object) of a tree. As described above, in response to receiving the selection input 204, the digital stroke selection system 116 performs an analysis for determining the nearest digital stroke. Additionally, the digital stroke selection system 116 performs an analysis for determining and selecting a collection of nearby strokes that are considered to be part of the drawing object.

Figure 3B:
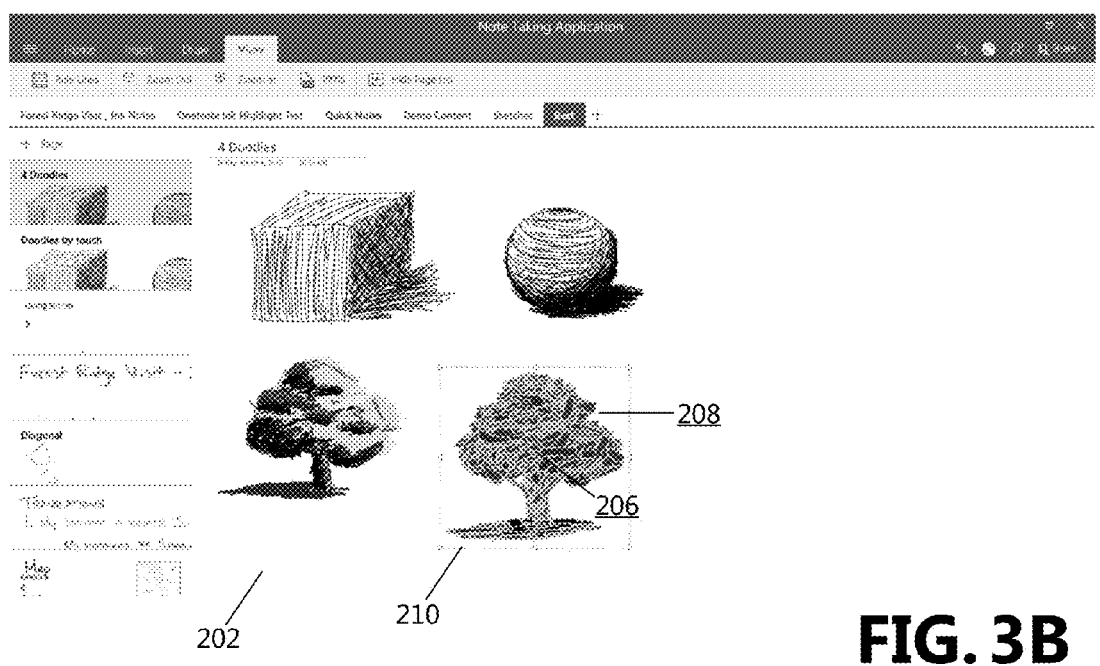
FIG. 3B is an illustration of an example graphical user interface of FIG. 3A displaying a selection of a stroke grouping embodied as a doodle.

With reference now to FIG. 3B, after the analysis and grouping is performed, the digital stroke selection system 116 updates the GUI 300 to display a determined stroke grouping 208 including the first stroke (i.e., stroke object 206) in a selected state. For example, in the illustrated example, the determined stroke grouping 208 includes a plurality of strokes forming a doodle (drawing object) of a tree. As illustrated, a selection outline 210 is shown displayed around the stroke grouping 208, wherein the user 110 is enabled to interact with the selection outline 210 for manipulating the stroke grouping 208.

Figure 4A:
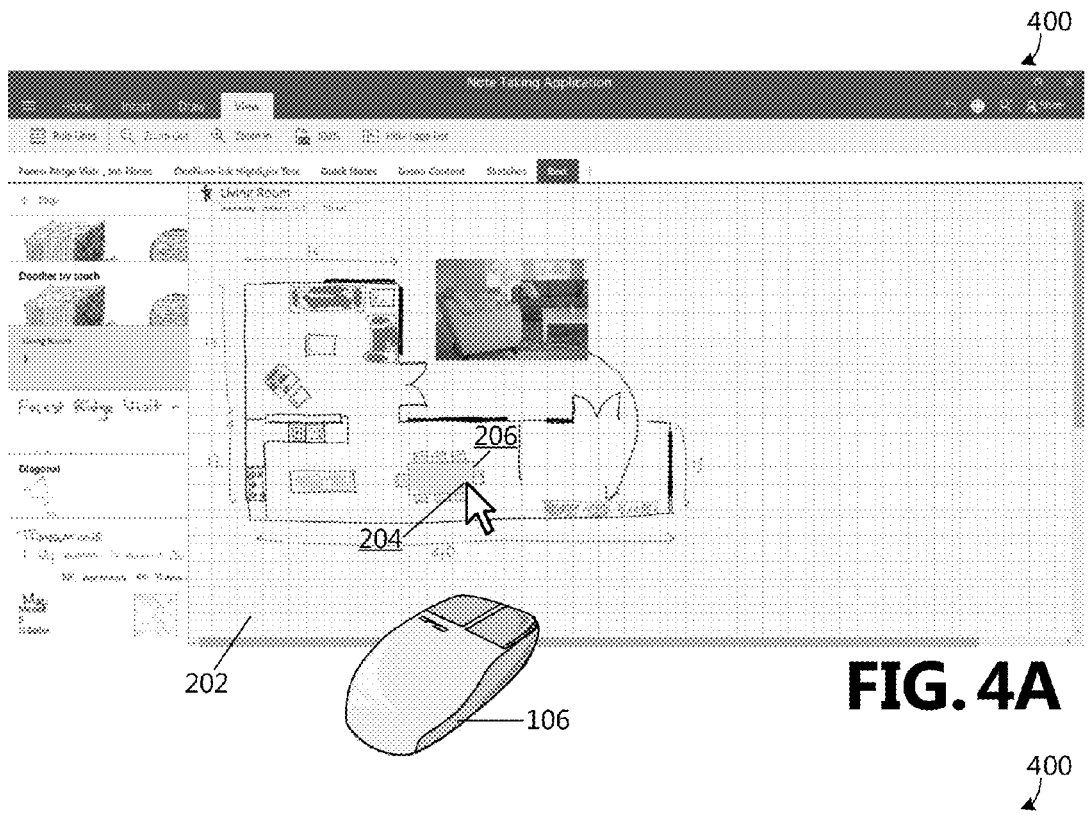
FIG. 4A is an illustration of an example user interface displaying drawing objects comprised of a plurality of digital strokes.

With reference now to FIG. 4A, an example GUI 400 including a canvas 202 on which the user 110 has provided "inking" input and on which the user 110 is shown providing a selection input 204 via an input device 106 is illustrated. As illustrated, the selection input 204 is made via a mouse cursor proximate to a stroke object 206 embodied as a line of a drawing of a table in a floor plan. As described above, in response to receiving the selection input 204, the digital stroke selection system 116 performs an analysis for determining the nearest digital stroke. Additionally, the digital stroke selection system 116 performs an analysis for determining and selecting a collection of nearby strokes that are considered to be part of the drawing object.

Figure 4B:
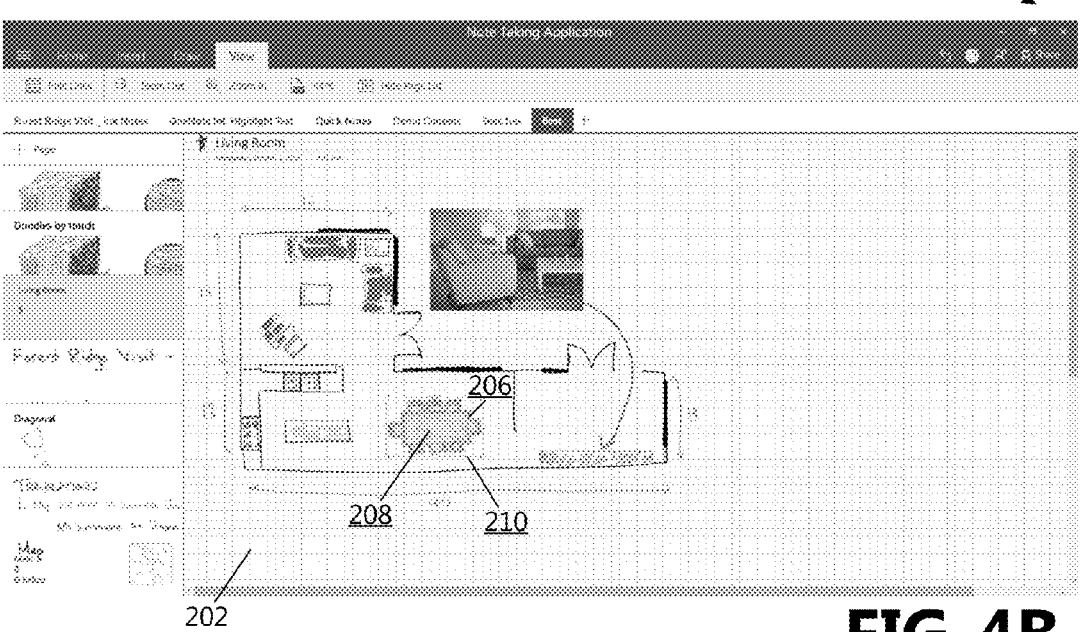
FIG. 4B is an illustration of an example graphical user interface of FIG. 4A displaying a selection of a stroke grouping embodied as a table in a floor plan.

With reference now to FIG. 4B, after the analysis and grouping is performed, the digital stroke selection system 116 updates the GUI 400 to display a determined stroke grouping 208 including the first stroke (i.e., stroke object 206) in a selected state. For example, in the illustrated example, the determined stroke grouping 208 includes a plurality of strokes forming a drawing of a table and chairs in a floor plan. As illustrated, a selection outline 210 is shown displayed around the stroke grouping 208, wherein the user 110 is enabled to interact with the selection outline 210 for manipulating the stroke grouping 208.

Figure 5A:
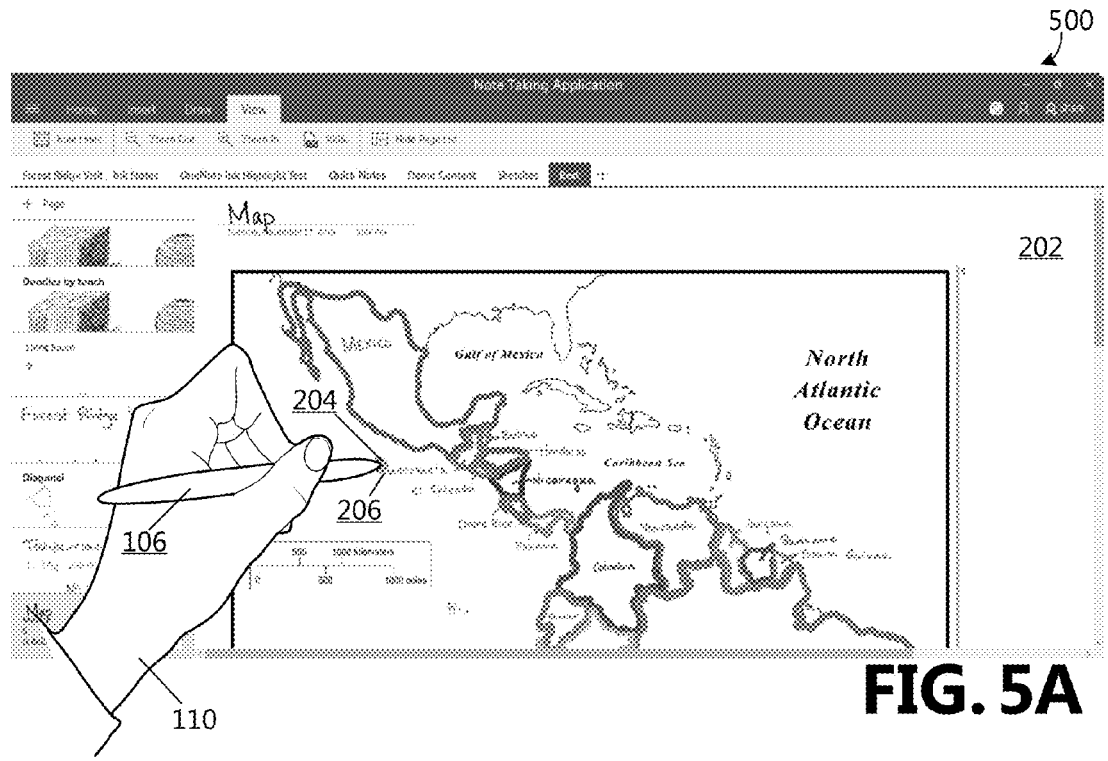
FIG. 5A is an illustration of an example user interface displaying words and drawing objects comprised of a plurality of digital strokes.

With reference now to FIG. 5A, an example GUI 500 including a canvas 202 on which the user 110 has provided "inking" input and on which the user 110 is shown providing a selection input 204 via an input device 106 is illustrated. As illustrated, the selection input 204 is made via touching a touchscreen with a stylus or digital pen proximate to a stroke object 206 resembling the letter "G." As described above, in response to receiving the selection input 204, the digital stroke selection system 116 performs an analysis for determining the nearest digital stroke. Additionally, the digital stroke selection system 116 performs an analysis for determining and selecting a collection of nearby strokes that are considered to be part of a grouping, such as a word.

Figure 5B:
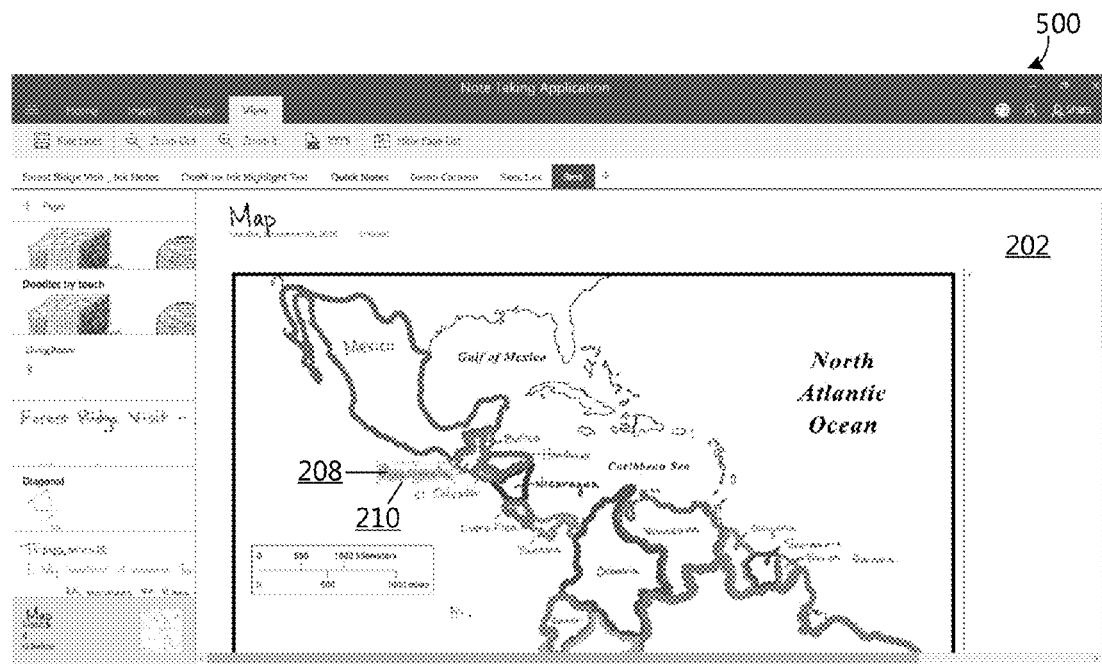
FIG. 5B is an illustration of an example graphical user interface of FIG. 5A displaying a selection of a stroke grouping embodied as a word on a map.

With reference now to FIG. 5B, after the analysis and grouping is performed, the digital stroke selection system 116 updates the GUI 500 to display a determined stroke grouping 208 including the first stroke (i.e., stroke object 206) in a selected state. For example, in the illustrated example, the determined stroke grouping 208 includes a plurality of strokes forming the letters in the word "Guatemala." As illustrated, a selection outline 210 is shown displayed around the stroke grouping 208, wherein the user 110 is enabled to interact with the selection outline 210 for manipulating the stroke grouping 208.

Figure 6A:
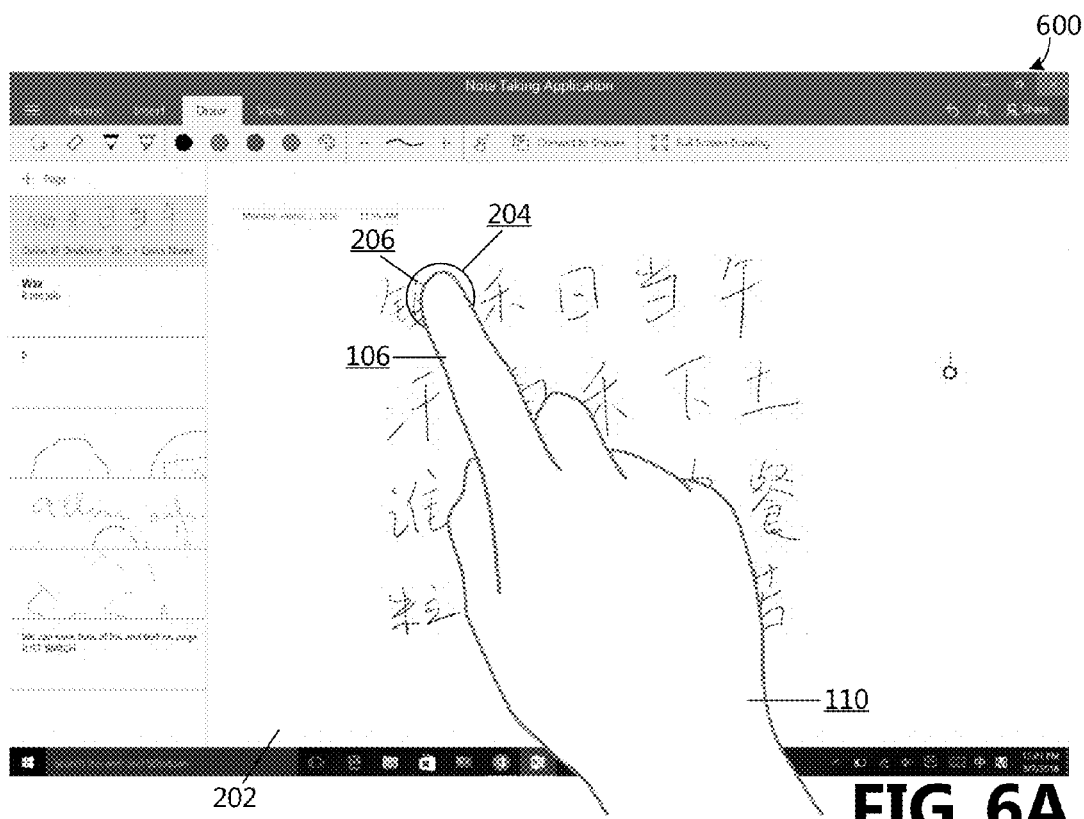
FIG. 6A is an illustration of an example user interface displaying character objects comprised of a plurality of digital strokes.

With reference now to FIG. 6A, an example GUI 600 including a canvas 202 on which the user 110 has provided "inking" input and on which the user 110 is shown providing a selection input 204 via an input device 106 is illustrated. As illustrated, the selection input 204 is made via a touch input by a user's finger on a touchscreen proximate to a stroke object 206 embodied as a stroke of a Far-East character (鋤). As described above, in response to receiving the selection input 204, the digital stroke selection system 116 performs an analysis for determining the nearest digital stroke. Additionally, the digital stroke selection system 116 performs an analysis for determining and selecting a collection of nearby strokes that are considered to be part of a grouping, such as a character.

Figure 6B:
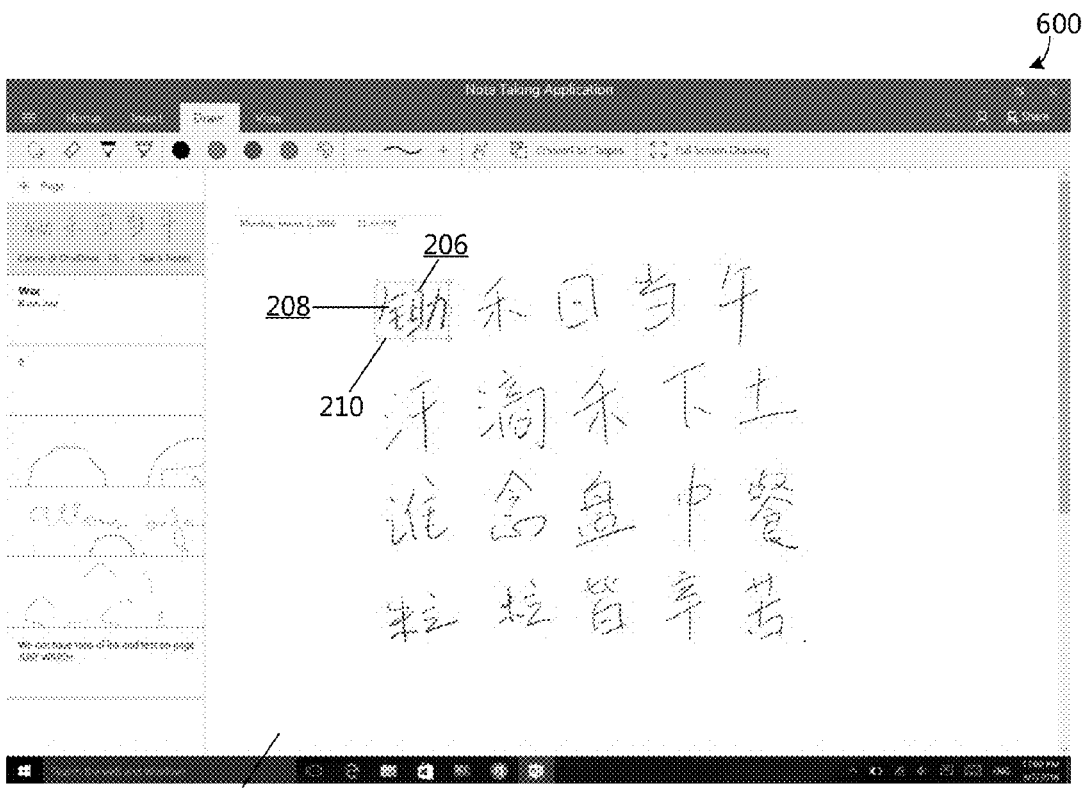
FIG. 6B is an illustration of an example graphical user interface of FIG. 6A displaying a selection of a stroke grouping embodied as a Far-East character.

With reference now to FIG. 6B, after the analysis and grouping is performed, the digital stroke selection system 116 updates the GUI 600 to display a determined stroke grouping 208 including the first stroke (i.e., stroke object 206) in a selected state. For example, in the illustrated example, the determined stroke grouping 208 includes a plurality of strokes forming a Far-East character. As illustrated, a selection outline 210 is shown displayed around the stroke grouping 208, wherein the user 110 is enabled to interact with the selection outline 210 for manipulating the stroke grouping 208.

Figure 7A:
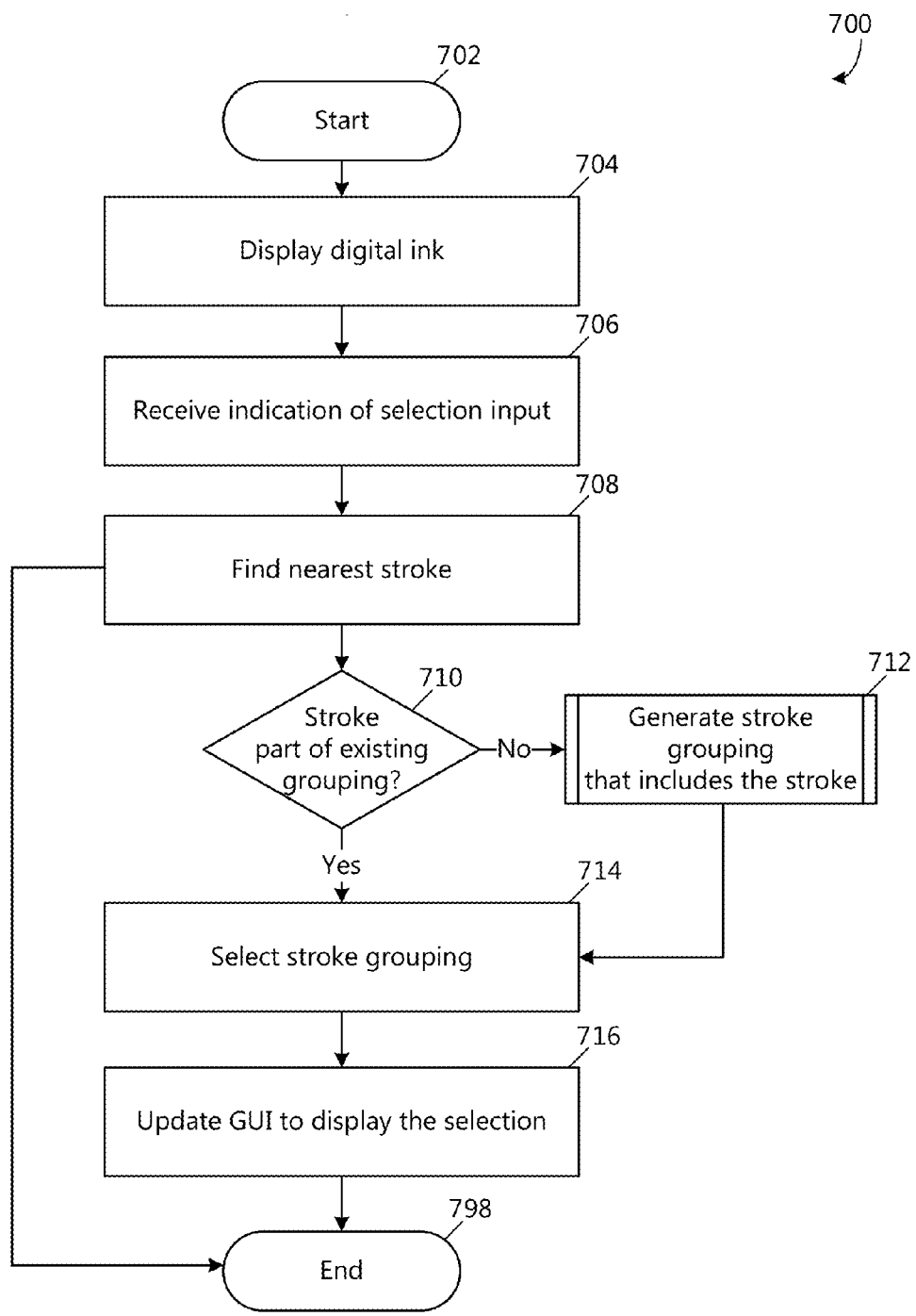
FIG. 7A is a flow chart showing general stages involved in an example method for improving accuracy and computer efficiency in selecting a grouping of digital strokes.

Having described an example operating environment 100, various components of the digital stroke selection system 116, and various GUI examples, FIG. 7A is a flow chart showing general stages involved in an example method 700 for improving accuracy and computer efficiency in selecting a grouping of digital strokes. With reference now to FIG. 7A, the method 700 begins at start OPERATION 702, and proceeds to OPERATION 704, where "inking" input is collected from an input device 106, such as a tablet pen, a finger, or a mouse, and a plurality of digital strokes are created and represented visually (i.e., displayed) on a canvas 202 displayed in a GUI.

The method 700 proceeds to OPERATION 706, where an indication of selection input is received. For example, a physical act or motion is selectively performed on or by a user-controlled input device 106 (e.g., finger, pen/stylus, mouse) at a position of a cursor (such as a mouse cursor or touch-point on a touch-screen interface), and is interpreted as a selection interaction. For example, the user 110 may tap or a double-tap a finger on a touchscreen or touchpad device, left-click or left-double-click a mouse button, tap or double tap on a touchscreen with a pen/stylus, etc.

The method 700 proceeds to OPERATION 708, where a nearest digital stroke to the position of the user-controlled cursor (e.g., mouse cursor or touch-point) is determined and passed to the digital stroke analyzer 122. As described above, in one example, a hit test method is used to determine if any stroke objects are within a predetermined radius of the cursor position. In another example, a nearest point method is used to determine a nearest point of a stroke object 206 to the cursor position. If no stroke is found within a given distance from the user-controlled cursor, it is determined that the user is attempting to perform a selection input unrelated to the existing digital ink (e.g., creating a new text location, selecting a non-ink object), and the method 700 may end at OPERATION 798.

When a nearest digital stroke 206 is found, the method 700 proceeds to DECISION OPERATION 710, where a determination is made as to whether the nearest digital stroke 206 (i.e., first stroke) is part of an existing or pre-defined stroke grouping 208, for example, previously grouped via ink analysis or by manual grouping by the user 110. When a determination is made that the first stroke (nearest digital stroke 206) is not part of an existing stroke grouping 208, the method 700 continues to OPERATION 712, where an analysis is performed to intuitively group and select a plurality of strokes. For example, the plurality of strokes is analyzed to determine whether a stroke is part of a character, word, drawing object, or other interrelated collection of data. Further, at OPERATION 712, a stroke grouping 208 that includes the first stroke (nearest digital stroke 206) and other determined related strokes is generated.

The method 700 continues to OPERATION 714 from OPERATION 712, or from DECISION OPERATION 710 when a positive determination is made that the first stroke (nearest digital stroke 206) is part of an existing stroke grouping 208, where the existing stroke grouping is selected.

The method 700 proceeds to OPERATION 716, where the GUI (e.g., GUI 200, 300, 400, 500, or 600) is updated to display the stroke grouping 208 in a selected state. For example, the GUI is updated to show the stroke grouping 208 as a selected object which the user 110 is enabled to manipulate via an interaction performed via an input with an input device 106. The method 700 ends at OPERATION 798.

Figure 7B:
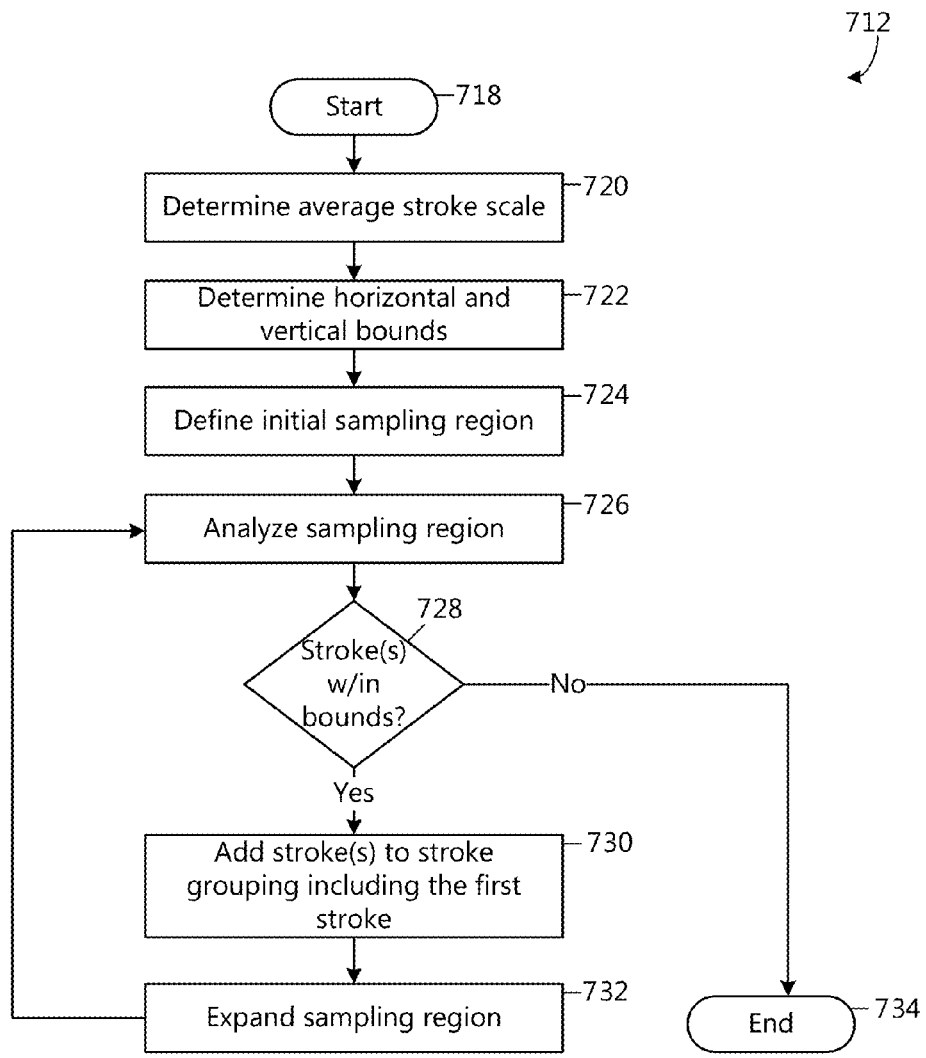
FIG. 7B is a flow chart showing general stages involved in one example method of generating a stroke grouping.

FIG. 7B is a flow chart showing general stages involved in one example method 712 of generating a stroke grouping (OPERATION 712 from FIG. 7A). The method 712 starts at OPERATION 718, and proceeds to OPERATION 720, where an average stroke scale is determined. According to an example, the average stroke scale includes the average width and height of strokes within a defined scale testing region, wherein the defined scale testing region is a region of a predetermined or calculated size around the first stroke. For example, the scale testing region can be various sizes, and may depend on the size of a screen 104 on which the GUI is displayed.

The method 712 proceeds to OPERATION 722, where vertical and horizontal proximity bounds are calculated based on the computed average stroke width and height, wherein the proximity bounds are defined for collecting stroke objects to add to a stroke grouping 208 with the first stroke 206.

At OPERATION 724, the initial sampling region is defined, wherein the initial sampling region defines the area in which other strokes must fall in order to be considered part of a grouping. The vertical boundaries of the initial sampling region are a predefined percentage of the calculated average stroke height above and below the first stroke 206 and the horizontal boundaries of the initial sampling region start at a predefined percentage of the calculated average stroke width from the first stroke 206. As strokes are found within the initial sampling region, that area will grow (increasing the proximity bounds) until it reaches the size of a maximum sampling region (i.e., the canvas 202).

The method 712 continues to OPERATION 726, where an analysis of the sampling region is performed for determining whether any stroke objects are located in the sampling region. At DECISION OPERATION 728, a determination is made as to whether one or more stroke objects are located in the sampling region. In one example, a stroke object is determined as located in the sampling region when any portion of the stroke object intersects the sampling region. In another example, a stroke object is determined to be located in the sampling region when a defined percentage of the stroke object intersects the sampling region, wherein the defined percentage is based on the computed average stroke scale.

When a positive determination is made, the method 712 proceeds to OPERATION 730, where the one or more strokes determined as located in the sampling region defined by the proximity bounds are added to the stroke grouping 208 including the first stroke 206. The method 712 continues to OPERATION 732, where when a stroke object is found within the sampling region, the sampling region is horizontally expanded (increasing the horizontal proximity bounds) for determining whether additional stroke objects should be included in the stroke grouping 208 until the sampling region is expanded to the edge of the canvas 202. After a horizontally expanding the sampling region until the edge of the canvas 202 is reached or until a negative determination is made (i.e., an additional stroke object is not included in the sampling region) at DECISION OPERATION 728, the sampling region is vertically expanded (increasing the vertical proximity bounds), and the method 712 returns to OPERATION 726 for another analysis of the sampling region with the new proximity bounds. The grouping generator 124 is operative to repeat the sampling region expansion (732) and analysis (726-730) until no additional stroke objects are identified and added to the stroke grouping 208. When no additional strokes objects are identified, the stroke grouping 208 is defined and includes the first stroke 206 and the stroke objects collected by the grouping generator 124. The method 712 ends at OPERATION 734.

As will be appreciated, in alternate aspects, the first proximity bound to be adjusted along a corresponding axis to expand the sampling region may be a vertical proximity bound or a horizontal proximity bound, with the other being a second proximity bound to be adjusted along a second corresponding axis to expand the sampling region. One of ordinary skill in the art will appreciate that the axes and bounds related in regard to method 712 may be switched in alternate aspects.

While implementations have been described in the general context of program modules that execute in conjunction with an application program that runs on an operating system on a computer, those skilled in the art will recognize that aspects may also be implemented in combination with other program modules. Generally, program modules include routines, programs, components, data structures, and other types of structures that perform particular tasks or implement particular abstract data types.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, according to an aspect, the aspects and functionalities described herein operate over distributed systems (e.g., cloud-based computing systems), where application functionality, memory, data storage and retrieval and various processing functions are operated remotely from each other over a distributed computing network, such as the Internet or an intranet. According to an aspect, user interfaces and information of various types are displayed via on-board computing device displays or via remote display units associated with one or more computing devices. For example, user interfaces and information of various types are displayed and interacted with on a wall surface onto which user interfaces and information of various types are projected. Interaction with the multitude of computing systems with which implementations are practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 8:
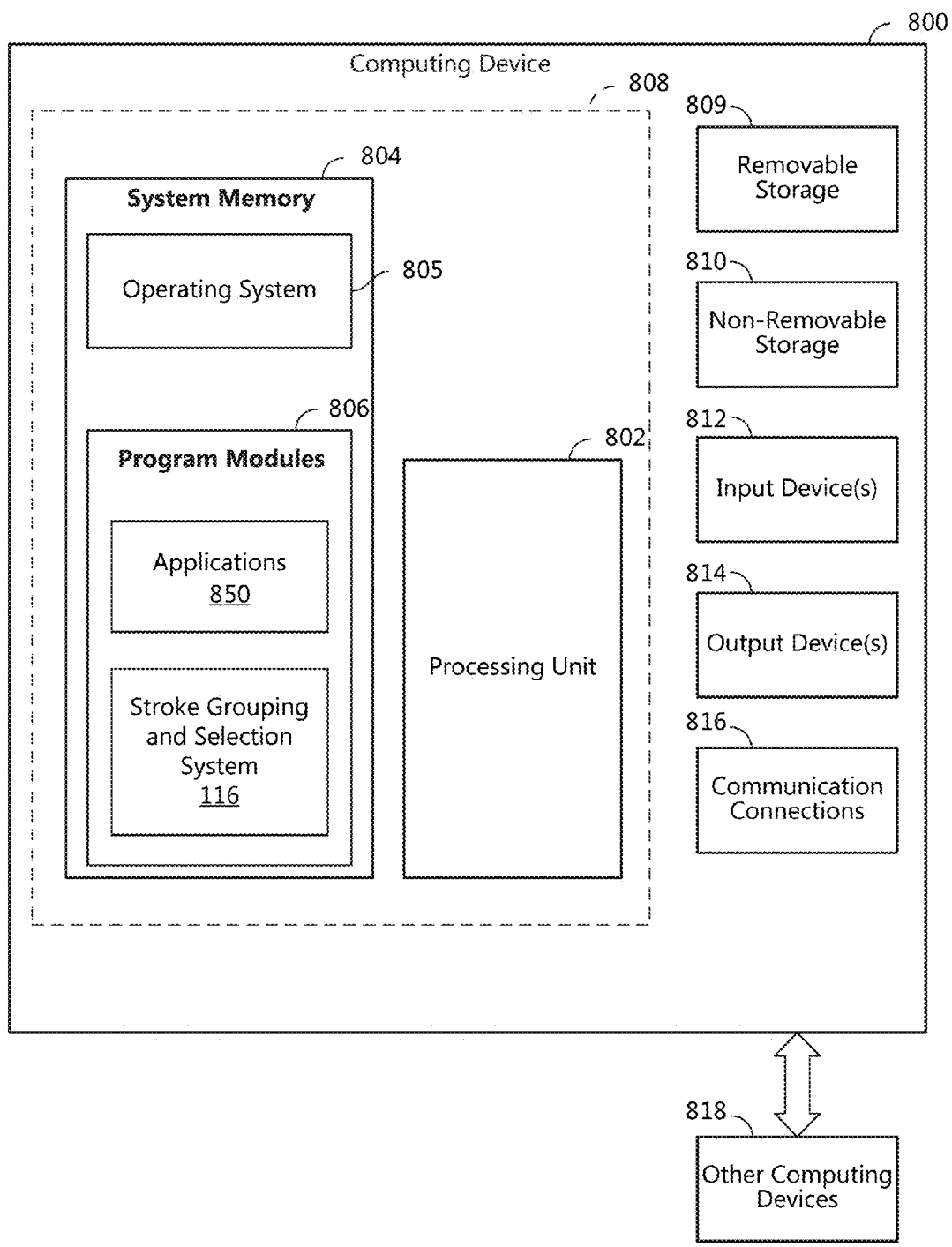
FIG. 8 is a block diagram illustrating example physical components of a computing device.
Figure 9A:
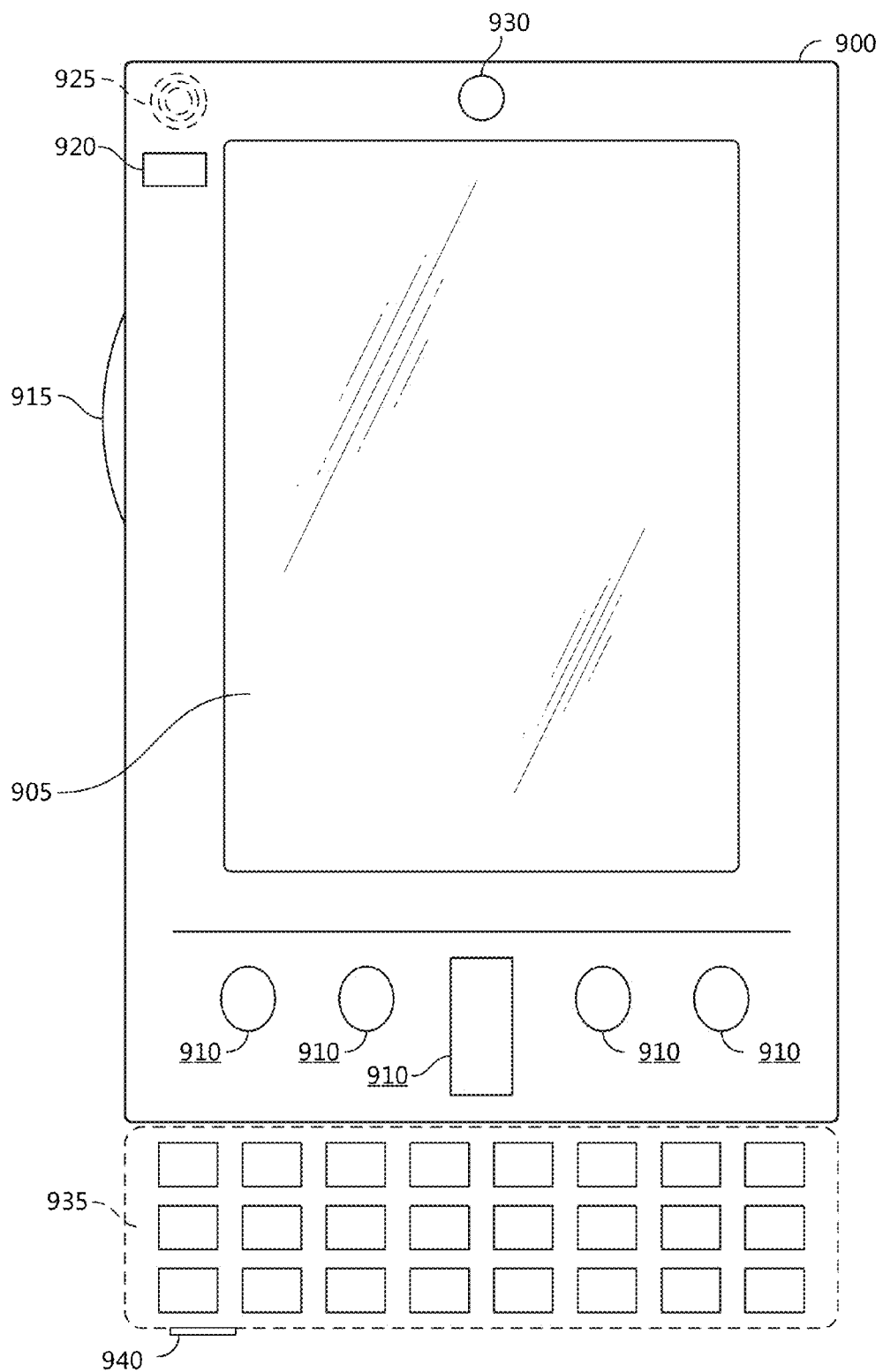
FIGS. 9A and 9B are block diagrams of a mobile computing device.
Figure 9B:
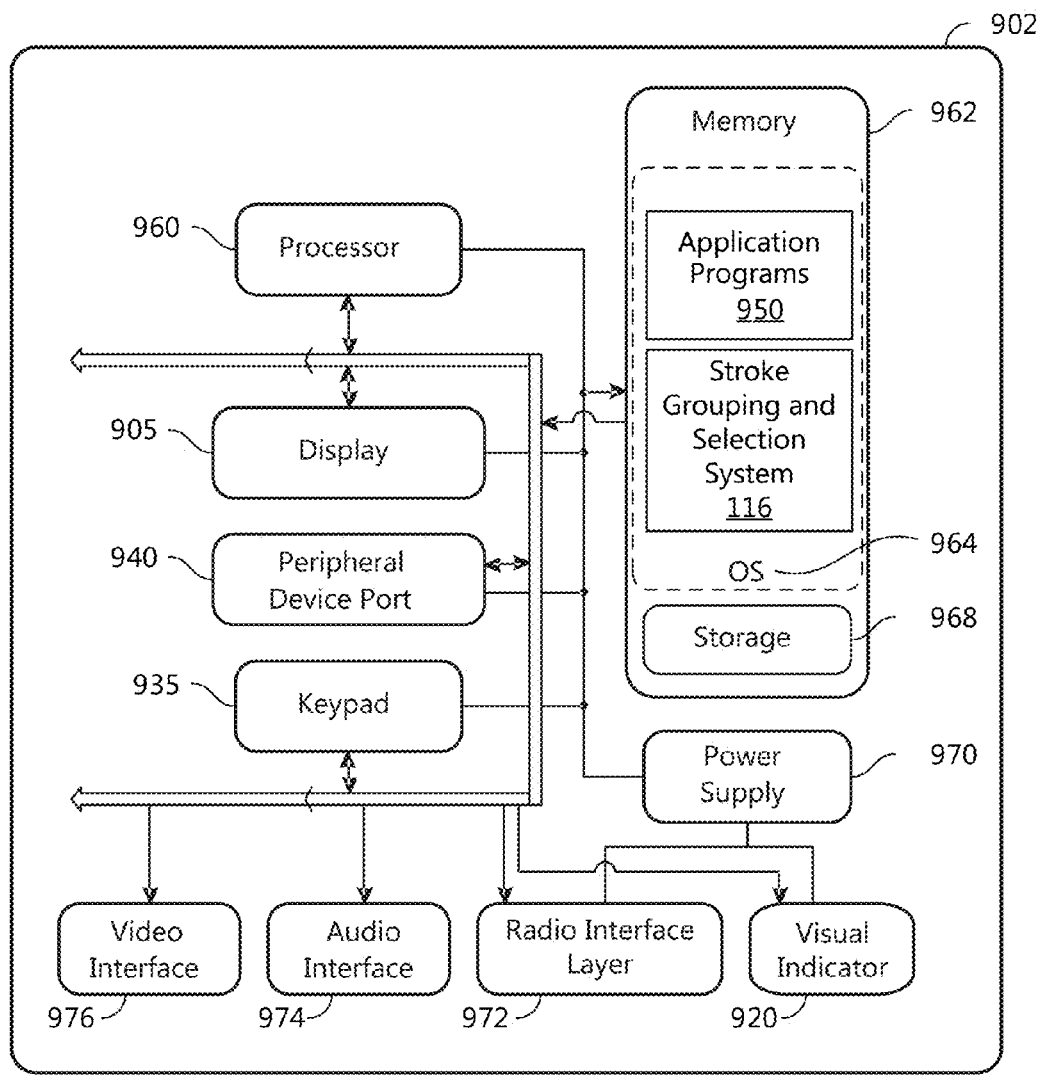
Figure 10:
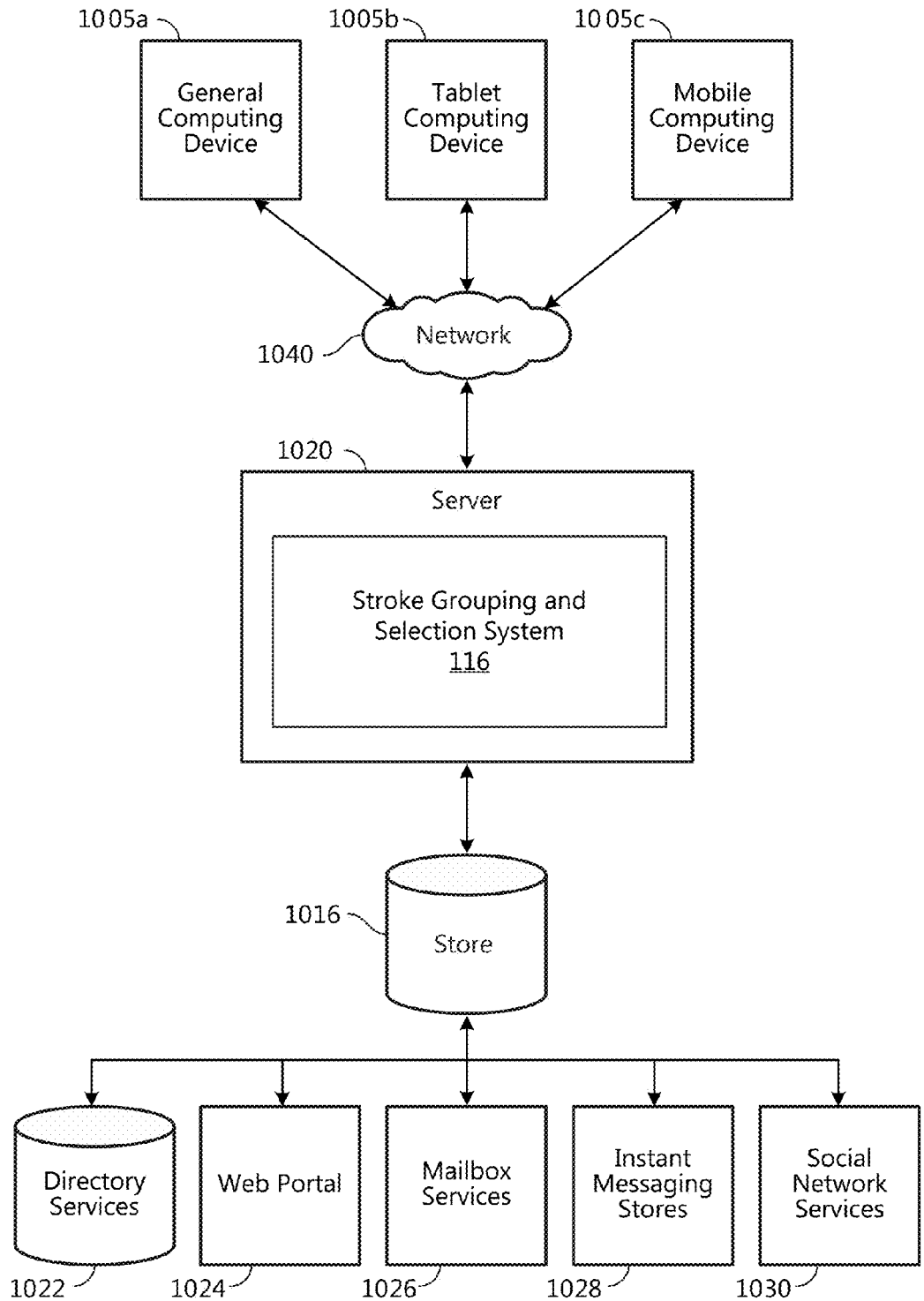
FIG. 10 is a block diagram of a distributed computing system.

FIGS. 8-10 and the associated descriptions provide a discussion of a variety of operating environments in which examples are practiced. However, the devices and systems illustrated and discussed with respect to FIGS. 8-10 are for purposes of example and illustration and are not limiting of a vast number of computing device configurations that are used for practicing aspects, described herein.

FIG. 8 is a block diagram illustrating physical components (i.e., hardware) of a computing device 800 with which examples of the present disclosure are be practiced. In a basic configuration, the computing device 800 includes at least one processing unit 802 and a system memory 804. According to an aspect, depending on the configuration and type of computing device, the system memory 804 comprises, but is not limited to, volatile storage (e.g., random access memory), non-volatile storage (e.g., read-only memory), flash memory, or any combination of such memories. According to an aspect, the system memory 804 includes an operating system 805 and one or more program modules 806 suitable for running software applications 850. According to an aspect, the system memory 804 includes the digital stroke selection system 116. The operating system 805, for example, is suitable for controlling the operation of the computing device 800. Furthermore, aspects are practiced in conjunction with a graphics library, other operating systems, or any other application program, and is not limited to any particular application or system. This basic configuration is illustrated in FIG. 8 by those components within a dashed line 808. According to an aspect, the computing device 800 has additional features or functionality. For example, according to an aspect, the computing device 800 includes additional data storage devices (removable and/or non-removable) such as, for example, magnetic disks, optical disks, or tape. Such additional storage is illustrated in FIG. 8 by a removable storage device 809 and a non-removable storage device 810.

As stated above, according to an aspect, a number of program modules and data files are stored in the system memory 804. While executing on the processing unit 802, the program modules 806 (e.g., digital stroke selection system 116) perform processes including, but not limited to, one or more of the stages of the methods 700,712 illustrated in FIGS. 7A,7B. According to an aspect, other program modules are used in accordance with examples and include applications such as electronic mail and contacts applications, word processing applications, spreadsheet applications, database applications, slide presentation applications, drawing or computer-aided application programs, etc.

According to an aspect, aspects are practiced in an electrical circuit comprising discrete electronic elements, packaged or integrated electronic chips containing logic gates, a circuit utilizing a microprocessor, or on a single chip containing electronic elements or microprocessors. For example, aspects are practiced via a system-on-a-chip (SOC) where each or many of the components illustrated in FIG. 8 are integrated onto a single integrated circuit. According to an aspect, such an SOC device includes one or more processing units, graphics units, communications units, system virtualization units and various application functionality all of which are integrated (or "burned") onto the chip substrate as a single integrated circuit. When operating via an SOC, the functionality, described herein, is operated via application-specific logic integrated with other components of the computing device 800 on the single integrated circuit (chip). According to an aspect, aspects of the present disclosure are practiced using other technologies capable of performing logical operations such as, for example, AND, OR, and NOT, including but not limited to mechanical, optical, fluidic, and quantum technologies. In addition, aspects are practiced within a general purpose computer or in any other circuits or systems.

According to an aspect, the computing device 800 has one or more input device(s) 812 such as a keyboard, a mouse, a pen, a sound input device, a touch input device, etc. The output device(s) 814 such as a display, speakers, a printer, etc. are also included according to an aspect. The aforementioned devices are examples and others may be used. According to an aspect, the computing device 800 includes one or more communication connections 816 allowing communications with other computing devices 818. Examples of suitable communication connections 816 include, but are not limited to, radio frequency (RF) transmitter, receiver, and/or transceiver circuitry; universal serial bus (USB), parallel, and/or serial ports.

The term computer readable media as used herein include computer storage media. Computer storage media include volatile and nonvolatile, removable and non-removable media implemented in any method or technology for storage of information, such as computer readable instructions, data structures, or program modules. The system memory 804, the removable storage device 809, and the non-removable storage device 810 are all computer storage media examples (i.e., memory storage.) According to an aspect, computer storage media includes RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 800. According to an aspect, any such computer storage media is part of the computing device 800. Computer storage media does not include a carrier wave or other propagated data signal.

According to an aspect, communication media is embodied by computer readable instructions, data structures, program modules, or other data in a modulated data signal, such as a carrier wave or other transport mechanism, and includes any information delivery media. According to an aspect, the term "modulated data signal" describes a signal that has one or more characteristics set or changed in such a manner as to encode information in the signal. By way of example, and not limitation, communication media includes wired media such as a wired network or direct-wired connection, and wireless media such as acoustic, radio frequency (RF), infrared, and other wireless media.

FIGS. 9A and 9B illustrate a mobile computing device 900, for example, a mobile telephone, a smart phone, a tablet personal computer, a laptop computer, and the like, with which aspects may be practiced. With reference to FIG. 9A, an example of a mobile computing device 900 for implementing the aspects is illustrated. In a basic configuration, the mobile computing device 900 is a handheld computer having both input elements and output elements. The mobile computing device 900 typically includes a display 905 and one or more input buttons 910 that allow the user to enter information into the mobile computing device 900. According to an aspect, the display 905 of the mobile computing device 900 functions as an input device (e.g., a touch screen display). If included, an optional side input element 915 allows further user input. According to an aspect, the side input element 915 is a rotary switch, a button, or any other type of manual input element. In alternative examples, mobile computing device 900 incorporates more or less input elements. For example, the display 905 may not be a touch screen in some examples. In alternative examples, the mobile computing device 900 is a portable phone system, such as a cellular phone. According to an aspect, the mobile computing device 900 includes an optional keypad 935. According to an aspect, the optional keypad 935 is a physical keypad. According to another aspect, the optional keypad 935 is a "soft" keypad generated on the touch screen display. In various aspects, the output elements include the display 905 for showing a graphical user interface (GUI), a visual indicator 920 (e.g., a light emitting diode), and/or an audio transducer 925 (e.g., a speaker). In some examples, the mobile computing device 900 incorporates a vibration transducer for providing the user with tactile feedback. In yet another example, the mobile computing device 900 incorporates input and/or output ports, such as an audio input (e.g., a microphone jack), an audio output (e.g., a headphone jack), and a video output (e.g., a HDMI port) for sending signals to or receiving signals from an external device. In yet another example, the mobile computing device 900 incorporates peripheral device port 940, such as an audio input (e.g., a microphone jack), an audio output (e.g., a headphone jack), and a video output (e.g., a HDMI port) for sending signals to or receiving signals from an external device.

FIG. 9B is a block diagram illustrating the architecture of one example of a mobile computing device. That is, the mobile computing device 900 incorporates a system (i.e., an architecture) 902 to implement some examples. In one example, the system 902 is implemented as a "smart phone" capable of running one or more applications (e.g., browser, e-mail, calendaring, contact managers, messaging clients, games, and media clients/players). In some examples, the system 902 is integrated as a computing device, such as an integrated personal digital assistant (PDA) and wireless phone.

According to an aspect, one or more application programs 950 are loaded into the memory 962 and run on or in association with the operating system 964. Examples of the application programs include phone dialer programs, e-mail programs, personal information management (PIM) programs, word processing programs, spreadsheet programs, Internet browser programs, messaging programs, and so forth. According to an aspect, the digital stroke selection system 116 is loaded into memory 962. The system 902 also includes a non-volatile storage area 968 within the memory 962. The non-volatile storage area 968 is used to store persistent information that should not be lost if the system 902 is powered down. The application programs 950 may use and store information in the non-volatile storage area 968, such as e-mail or other messages used by an e-mail application, and the like. A synchronization application (not shown) also resides on the system 902 and is programmed to interact with a corresponding synchronization application resident on a host computer to keep the information stored in the non-volatile storage area 968 synchronized with corresponding information stored at the host computer. As should be appreciated, other applications may be loaded into the memory 962 and run on the mobile computing device 900.

According to an aspect, the system 902 has a power supply 970, which is implemented as one or more batteries. According to an aspect, the power supply 970 further includes an external power source, such as an AC adapter or a powered docking cradle that supplements or recharges the batteries.

According to an aspect, the system 902 includes a radio 972 that performs the function of transmitting and receiving radio frequency communications. The radio 972 facilitates wireless connectivity between the system 902 and the "outside world," via a communications carrier or service provider. Transmissions to and from the radio 972 are conducted under control of the operating system 964. In other words, communications received by the radio 972 may be disseminated to the application programs 950 via the operating system 964, and vice versa.

According to an aspect, the visual indicator 920 is used to provide visual notifications and/or an audio interface 974 is used for producing audible notifications via the audio transducer 925. In the illustrated example, the visual indicator 920 is a light emitting diode (LED) and the audio transducer 925 is a speaker. These devices may be directly coupled to the power supply 970 so that when activated, they remain on for a duration dictated by the notification mechanism even though the processor 960 and other components might shut down for conserving battery power. The LED may be programmed to remain on indefinitely until the user takes action to indicate the powered-on status of the device. The audio interface 974 is used to provide audible signals to and receive audible signals from the user. For example, in addition to being coupled to the audio transducer 925, the audio interface 974 may also be coupled to a microphone to receive audible input, such as to facilitate a telephone conversation. According to an aspect, the system 902 further includes a video interface 976 that enables an operation of an on-board camera 930 to record still images, video stream, and the like.

According to an aspect, a mobile computing device 900 implementing the system 902 has additional features or functionality. For example, the mobile computing device 900 includes additional data storage devices (removable and/or non-removable) such as, magnetic disks, optical disks, or tape. Such additional storage is illustrated in FIG. 9B by the non-volatile storage area 968.

According to an aspect, data/information generated or captured by the mobile computing device 900 and stored via the system 902 is stored locally on the mobile computing device 900, as described above. According to another aspect, the data is stored on any number of storage media that is accessible by the device via the radio 972 or via a wired connection between the mobile computing device 900 and a separate computing device associated with the mobile computing device 900, for example, a server computer in a distributed computing network, such as the Internet. As should be appreciated such data/information is accessible via the mobile computing device 900 via the radio 972 or via a distributed computing network. Similarly, according to an aspect, such data/information is readily transferred between computing devices for storage and use according to well-known data/information transfer and storage means, including electronic mail and collaborative data/information sharing systems.

FIG. 10 illustrates one example of the architecture of a system for providing automated digital stroke grouping for improved selection accuracy and improved computer efficiency as described above. Content developed, interacted with, or edited in association with the digital stroke selection system 116 is enabled to be stored in different communication channels or other storage types. For example, various documents may be stored using a directory service 1022, a web portal 1024, a mailbox service 1026, an instant messaging store 1028, or a social networking site 1030. The digital stroke selection system 116 is operative to use any of these types of systems or the like for providing automated digital stroke grouping for improved selection accuracy and improved computer efficiency, as described herein. According to an aspect, a server 1020 provides the digital stroke selection system 116 to clients 1005a,b,c. As one example, the server 1020 is a web server providing the digital stroke selection system 116 over the web. The server 1020 provides the digital stroke selection system 116 over the web to clients 1005 through a network 1040. By way of example, the client computing device is implemented and embodied in a personal computer 1005a, a tablet computing device 1005b or a mobile computing device 1005c (e.g., a smart phone), or other computing device. Any of these examples of the client computing device are operable to obtain content from the store 1016.

Implementations, for example, are described above with reference to block diagrams and/or operational illustrations of methods, systems, and computer program products according to aspects. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more examples provided in this application are not intended to limit or restrict the scope as claimed in any way. The aspects, examples, and details provided in this application are considered sufficient to convey possession and enable others to make and use the best mode. Implementations should not be construed as being limited to any aspect, example, or detail provided in this application. Regardless of whether shown and described in combination or separately, the various features (both structural and methodological) are intended to be selectively included or omitted to produce an example with a particular set of features. Having been provided with the description and illustration of the present application, one skilled in the art may envision variations, modifications, and alternate examples falling within the spirit of the broader aspects of the general inventive concept embodied in this application that do not depart from the broader scope.

We claim:

1. A device to improve accuracy and computer efficiency for selecting a grouping of digital strokes, comprising:
    a digital stroke analyzer configured to:
        receive a selection of a digital stroke in a graphical user interface; and
        make a determination as to whether the digital stroke is part of an existing stroke grouping;
    a grouping generator configured to:
        in response to a determination that the digital stroke is not part of an existing stroke grouping, group a plurality of strokes, including the selected digital stroke, into a stroke grouping, wherein:
            boundaries are determined for a sampling region;
            the sampling region is analyzed to determine whether a second digital stroke is in the sampling region; and
            when a determination is made that a second digital stroke is in the sampling region:
                the second digital stroke is added to the stroke grouping; and
            a first sampling region bound of the sampling region is expanded along at least one axis; and
            recursively analyze the sampling region, wherein additional digital strokes found in the sampling region are added to the stroke grouping, and the first sampling region bound of the sampling region is expanded along the at least one axis until an additional digital stroke is not found in the sampling region; and
        select the stroke grouping or the existing stroke grouping; and
    a user interface engine configured to:
        update the graphical user interface to display the selected stroke grouping or selected existing stroke grouping.

2. The device of claim 1, wherein prior to receiving the selection of the digital stroke, the device further comprises an input manager configured to:
    receive a selection input at a location on the graphical user interface;
    find a nearest digital stroke to the location; and
    select the nearest digital stroke.

3. The device of claim 1, wherein the existing stroke grouping comprises a plurality of strokes grouped via ink analysis or manual grouping by a user.

4. The device of claim 1, wherein in grouping the plurality of strokes into the stroke grouping, it is determined that the additional digital stroke is not found in the sampling region in response to the first sampling region bound reaching an edge of a canvas of the graphical user interface.

5. The device of claim 1, wherein in determining boundaries for the sampling region, the grouping generator is configured to:
    define a scale testing region around the digital stroke;
    calculate an average stroke width and height based on one or more strokes in the scale testing region; and
    define the sampling region based on predetermined percentages of the calculated average stroke width and height.

6. The device of claim 5, wherein in defining the sampling region based on predetermined percentages of the calculated average stroke width and height, the grouping generator is configured to:
- define vertical boundaries one-fourth of the calculated average stroke height above and below the digital stroke; and
- define horizontal boundaries one-half of the calculated average stroke width to the left and right of the digital stroke.

7. The device of claim 5, wherein in analyzing the sampling region to determine whether a second digital stroke is in the sampling region, the grouping generator is configured to:
- determine whether the second digital stroke is located within the sampling region; or
- determine whether a portion of the second digital stroke intersects the sampling region.

8. A computer-implemented method for improving accuracy and computer efficiency for selecting a grouping of digital strokes, comprising:
- receiving a selection of a first digital stroke in a graphical user interface;
- making a determination as to whether the first digital stroke is part of an existing stroke grouping;
- in response to determining that the first digital stroke is not part of an existing stroke grouping, grouping a plurality of strokes including the first digital stroke into a stroke grouping, further comprising:
  - determining boundaries for a sampling region;
  - analyzing the sampling region to determine whether a second digital stroke is in the sampling region; and
  - when a determination is made that a second digital stroke is in the sampling region:
    - adding the second digital stroke to the stroke grouping; and
    - expanding a first sampling region bound of the sampling region along at least one axis; and
    - recursively analyzing the sampling region, adding additional digital strokes found in the sampling region to the stroke grouping, and expanding the first sampling region bound of the sampling region along the at least one axis until an additional digital stroke is not found in the sampling region; and
- selecting the stroke grouping or the existing stroke grouping; and
- updating the graphical user interface to display the selected stroke grouping or existing stroke grouping.

9. The computer-implemented method of claim 8, wherein it is determined that the additional digital stroke is not found in the sampling region in response to the first sampling region bound reaching an edge of a canvas of the graphical user interface.

10. The computer-implemented method of claim 8, wherein determining boundaries for the sampling region comprises:
- defining a scale testing region around the first digital stroke;
- calculating an average stroke width and height based on one or more strokes in the scale testing region; and
- defining the sampling region based on predetermined percentages of the calculated average stroke width and height.

11. The computer-implemented method of claim 10, wherein in defining the sampling region based on predetermined percentages of the calculated average stroke width and height comprises:
- defining vertical boundaries one-fourth of the calculated average stroke height above and below the first digital stroke; and
- defining horizontal boundaries one-half of the calculated average stroke width to the left and right of the first digital stroke.

12. The computer-implemented method of claim 8, wherein in analyzing the sampling region to determine whether a second digital stroke is in the sampling region comprises:
- determining whether the second digital stroke is located within the sampling region; or
- determining whether a portion of the second digital stroke intersects the sampling region.

13. The computer-implemented method of claim 8, wherein prior to receiving the selection of the digital stroke:
- receiving a selection input at a location on the graphical user interface;
- finding a nearest digital stroke to the location; and
- selecting the nearest digital stroke.

14. The computer-implemented method of claim 8, wherein making a determination as to whether the first digital stroke is part of an existing stroke grouping comprises determining whether the digital stroke is part of a plurality of strokes grouped via ink analysis or manual grouping by the user.

15. A computer-readable memory device including instructions for an application programming interface for stroke selection in a productivity application, which when executed by a computer are configured to:
- receive a selection of a digital stroke, wherein the digital stroke is displayed in a graphical user interface;
- make a determination as to whether the digital stroke is part of an existing stroke grouping; and
- in response to determining that the digital stroke is not part of an existing stroke grouping:
- group a plurality of strokes including the selected digital stroke into a stroke grouping, wherein:
- boundaries are determined for a sampling region;
- the sampling region is analyzed to determine whether a second digital stroke is in the sampling region; and
- when a determination is made that a second digital stroke is in the sampling region:
  - the second digital stroke is added to the stroke grouping;
  - a first sampling region bound of the sampling region is expanded along at least one axis; and
  - the sampling region is recursively analyzed, wherein the first sampling region bound of the sampling region is expanded along the at least one axis until an additional digital stroke is not found in the sampling region or until the first sampling region bound cannot be extended along the at least one axis, and wherein additional digital strokes found in the sampling region are added to the stroke grouping; and
- select the stroke grouping or the existing stroke grouping; and
- update the graphical user interface to display the selected stroke grouping or the selected existing stroke grouping.

16. The computer-readable memory device of claim 15, wherein in grouping the plurality of strokes into the stroke grouping it is determined that the first sampling region bound cannot be extended along the at least one axis in response to the sampling region expanding to an edge of a canvas of the graphical user interface.

17. The computer-readable memory device of claim 15, wherein in determining boundaries for the sampling region, the digital stroke selection system is further configured to:
   define a scale testing region around the digital stroke;
   calculate an average stroke width and height based on one or more strokes in the scale testing region; and
   define the sampling region based on predetermined percentages of the calculated average stroke width and height.

18. The computer-readable memory device of claim 17, wherein in defining the sampling region based on predetermined percentages of the calculated average stroke width and height, the digital stroke selection system is further configured to:
   define vertical boundaries one-fourth of the calculated average stroke height above and below the digital stroke; and
   define horizontal boundaries one-half of the calculated average stroke width to the left and right of the digital stroke.

19. The computer-readable memory device of claim 15, wherein in analyzing the sampling region to determine whether a second digital stroke is in the sampling region, the digital stroke selection system is further configured to:
   determine whether the second digital stroke is located within the sampling region; or
   determine whether a portion of the second digital stroke intersects the sampling region.

20. The computer-readable memory device of claim 15, wherein prior to receiving the selection of the digital stroke, the digital stroke selection system is further configured to:
   receive a selection input at a location on the graphical user interface;
   find a nearest digital stroke to the location; and
   select the nearest digital stroke.

\* \* \* \* \*